US009443232B1

(12) United States Patent
Silva et al.

(10) Patent No.: US 9,443,232 B1
(45) Date of Patent: Sep. 13, 2016

(54) CALENDAR INTEGRATION WITH TEXT MESSAGING TO FACILITATE NO-TIME-SPECIFIED EVENTS

(71) Applicant: INTERNATIONAL BUSINESS MACHINES CORPORATION, Armonk, NY (US)

(72) Inventors: Asima Silva, Holden, MA (US); Marit L. Imsdahl, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/053,288

(22) Filed: Feb. 25, 2016

(51) Int. Cl.
*G06F 15/16* (2006.01)
*G06Q 10/10* (2012.01)
*H04W 4/14* (2009.01)

(52) U.S. Cl.
CPC ........... *G06Q 10/1095* (2013.01); *H04W 4/14* (2013.01)

(58) Field of Classification Search
CPC .......................... G06Q 10/1095; H04W 4/14
See application file for complete search history.

(56) References Cited

U.S. PATENT DOCUMENTS

| 7,058,396 | B2* | 6/2006 | Wu | H04L 29/06 455/412.1 |
| 7,321,930 | B2* | 1/2008 | Ferguson | G06Q 10/10 709/223 |
| 7,584,253 | B2* | 9/2009 | Curbow | G06Q 10/109 709/206 |
| 8,078,203 | B2* | 12/2011 | Kamdar | H04L 12/585 455/412.1 |
| 8,204,521 | B2* | 6/2012 | Hardy | G06Q 10/109 455/412.2 |
| 8,457,669 | B2* | 6/2013 | Hardy | G06Q 10/109 455/412.1 |
| 2004/0203946 | A1* | 10/2004 | Wu | H04L 29/06 455/466 |
| 2006/0224722 | A1* | 10/2006 | McGowan | G06Q 10/107 709/224 |
| 2007/0124312 | A1* | 5/2007 | Simpson | G06Q 10/107 |
| 2009/0029724 | A1* | 1/2009 | Hardy | G06Q 10/109 455/466 |
| 2009/0098859 | A1* | 4/2009 | Kamdar | H04L 12/585 455/412.1 |
| 2012/0166565 | A1* | 6/2012 | Hardy | G06Q 10/109 709/206 |
| 2012/0296993 | A1 | 11/2012 | Heyman et al. | |
| 2014/0195621 | A1 | 7/2014 | Rao Dv | |
| 2015/0193740 | A1* | 7/2015 | Nudel | G06Q 10/1095 705/7.19 |

* cited by examiner

*Primary Examiner* — Moustafa M Meky
(74) *Attorney, Agent, or Firm* — Patents on Demand P.A.; Brian K. Buccheit; Scott M. Garrett (57) ABSTRACT

A text based communication from a sender to a recipient is analyzed to automatically detect a no-specific-time (NST) text segment within the text communication. Responsive to detecting the NTS text segment, establishment of a firm time consistent with the NST text segment based on availability of the recipient per an electronic calendar of the recipient, referred to hereafter as the recipient's calendar, is programmatically facilitated. The NST text segment references a future time for a gathering that is lacks a specific date and time. Facilitating establishment of the firm time includes accessing an electronic calendar of the recipient, which is maintained by a server independent of a communication server responsible for sending and receiving communications for the recipient.

1 Claim, 3 Drawing Sheets

FIG. 3

CALENDAR INTEGRATION WITH TEXT MESSAGING TO FACILITATE NO-TIME-SPECIFIED EVENTS

BACKGROUND

The present invention relates to the field of text messaging and calendaring and, more particularly, to calendar integration with text messaging (e.g., SMS texts) to facilitate no-time-specified events.

People utilize text messaging, or texting, to compose, send, and receive brief electronic messages between two devices, often mobile phones. Text messaging is typically conveyed over a phone network (e.g., using a short messaging service referred to as SMS; using Multimedia Messaging Service referred to as MMS; and the like. By definition, text messaging is a fast, light-weight communication mechanism, which is one of its principle advantages and distinctions over competing technologies, such as email messaging. This light-weight nature means that conventionally there is no integration between a text-messaging application and other applications, which is a situation different from what exists with robust communication systems, like integrated messaging. Robust communication systems often integrate email messaging, with task management, calendaring, and other such functions. These functions are often distinct from each other (yet found in a common application) even though these various functions share the same communication technologies/network (e.g., TCP/IP over an IP network) and utilize the same back-end server.

What is needed is a way to bridge the different communication technologies to make it easier to plan for a time-unspecified future gathering. Specifically, to reduce an end-user overhead to facilitate scheduling without requiring an end-user to take a series of actions across different applications. This would be especially advantageous to short communication mechanisms, like text messaging, where often a user legitimately plans to get together with another, yet fails to follow-up on an initial communication so that no meeting ever takes place, which is a common occurrence.

BRIEF SUMMARY

One aspect of the present invention can include a system, a computer program product, and a method for a text messaging program comprising processor executable instructions stored in a non-transitory storage media. The text messaging program includes a text communication interface, a content analyzer, a calendar integration module, and a recipient presentation interface. The text communication interface sends and receives text based communications conveyed through a short messaging service (SMS) gateway between at least a sender and a recipient. The content analyzer for programmatically analyzes the text based communications conveyed through the SMS gateway. The content analyzer automatically detects no-specific-time (NST) text segments within text messages from the sender to the recipient. The content analyzer responsive to detections of NST text segments programmatically facilitates establishes a firm time consistent with the NST text segment based on availability of the recipient per an electronic calendar of the recipient. NST text segments reference a future time for a gathering that lacks a specific date and time. The calendar integration module provides the text messaging program access to an electronic calendar of the recipient, referred to hereafter as the recipient's calendar. The access includes search capabilities of the electronic calendar to automatically determine one or more specific time slots consistent with the NTS text segment to facilitate establishing the firm time. The one or more specific time slots are automatically determined non-conflicting time frames for which the recipient is available per entries of the recipient's calendar. The one or more time slots are not manually entered by the sender, by the recipient, or by any human. The recipient presentation interface automatically presents the one or more time slots to the recipient of the NTS text segments. The recipient presentation interface is programmatically integrated with the text communication interface.

Another aspect of the present invention can include a method, a computer program product, and a system for integrating calendar scheduling and text messages. In this aspect, a text based communication from a sender to a recipient is analyzed to automatically detect a no-specific-time (NST) text segment within the text communication. Responsive to detecting the NST text segment, establishment of a firm time consistent with the NST text segment based on availability of the recipient per an electronic calendar of the recipient, referred to hereafter as the recipient's calendar, is programmatically facilitated. The NST text segment references a future time for a gathering that is lacks a specific date and time. Facilitating establishment of the firm time includes accessing an electronic calendar of the recipient, which is maintained by a server independent of a communication server responsible for sending and receiving communications for the recipient. Facilitating establishment of the firm time also includes automatically determining one or more specific time slots consistent with the NTS text segment to facilitate establishing the firm time. The one or more specific time slots are automatically determined non-conflicting time frames for which the recipient is available per entries of the recipient's calendar. The one or more time slots are not manually entered by the sender, by the recipient, or by any human. Facilitating establishment of the firm time also includes presenting the text message to the recipient through a graphical user interface of a text communication application. Facilitating establishment of the firm time also includes presenting the one or more time slots to the recipient via the graphical user interface of the text communication application.

DETAILED DESCRIPTION

Embodiments of the disclosure integrate text messaging communications occurring via a short messaging service (SMS) gateway with an end-user's calendar, which is maintained in a separate server/account. The disclosure represents an improvement on SMS-based communications in that SMS communications (text messages) are automatically analyzed to detect a time unspecified future gathering. This type of text message is referred to herein as a no-time-specified text or NTS text. Upon a text message being analyzed to determine content that a NTS text has been received, a recipient's calendar maintained electronically on a system independent from the text messaging one is searched for suitable time slots for a gathering. This information about the end-user's availability is conveyed to the NTS text recipient. In one embodiment, the recipient of the NTS text is prompted with their own availability, per their schedule. For example, in one embodiment a fly-over window automatically appears next to the NTS content of the text, which shows one or more possible time-frames for the gathering. In another embodiment, a responsive text inserting the date is automatically constructed for recipient approval before this new text is sent. In one embodiment, when a recipient can be prompted to accept the suggested time (from their text messaging application) at which point the time is automatically scheduled in the recipient's calendar. Thus, responsive to the recipient receiving the NTS text, a new entry is automatically created in the recipient's calendaring system. Importantly, this new entry is for a specific non-conflicting time (given the recipient's schedule), that nether neither the recipient nor the sender of the NTS message explicitly suggested. The scheduling facilitator (e.g., calendar integration module 316) can have access to the recipient's calendar and not the sender's calendar in one embodiment. This is due to multiple independent systems being utilized to maintain calendaring information, which is confidential information for which an authorization such as a password and account is required. The text messaging system can have access to the recipient's calendar, but not that of the sender due to these access restrictions. Similarly, privacy of the recipient's calendar can be retained in embodiments of the disclosure, since all facilitating of the scheduling in contemplated embodiments is recipient-side only so that the recipient's calendaring information is not exposed to the sender in any manner. For example, a recipient may have availability but may not wish to meet with the sender, in which case the sender is never apprised of the availability and the recipient can obscure their availability as/if desired during the text exchange with the sender.

In one example, the NTS text can include "let's get together next week" or "let's do lunch soon" which alludes to a future time, yet which is ambiguous in this regard requiring a firming time to be established. A user can be prompted for their own availability to find a convenient time within the alluded to time frame. In embodiments, the system can learn from a particular user's behavior to distinguish between non-committal responses that a recipient really doesn't want to schedule and those of significant interest to a recipient. Thus, the disclosure's technological improvement to traditional text-messaging can be designed to be minimally intrusive and non-cumbersome to an end-user.

In one contemplated embodiment, a level of access can be granted to the calendars of both the sender and recipient, and a suggested time can be one that is available, per both calendars, which facilitates the future gathering alluded to in the NTS text. Promptings and pop-ups can be implemented as a background process (separate from the text messaging application) in embodiments of the disclosure. In various embodiments, a distinguishing visual indicator (such as color coding, highlighting, changing front, showing an icon, and the like) can be included intra-text to indicate the suggested time of availability, per the calendar application.

In embodiments, the disclosure can add an "auto-fill-in" or "autocorrecting" metaphor (where spelling/grammar is corrected) to scheduling events responsive to text communications. For example, in one contemplated embodiment, a text message can actually include a specified time, which conflicts with a calendar entry, where the conflict is shown to the recipient via the text-messaging interface. A suggested message can be constructed, where the system automatically detects the potential conflict, for a possible time that is non-conflicting with the end-user's schedule.

The disclosure's technology improvements for text messaging improves conflict-less scheduling, reduces unnecessary conversations pertaining to schedules, minimizes end-user coordination, and provides a highly portable scheduling aid that targets text-messaging communications. Appreciatively, the disclosure can be adapted for other modes of communication such as chat forums, social media communications, verbal communications, email, and the like, which are to be considered as embodiments within scope of this disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
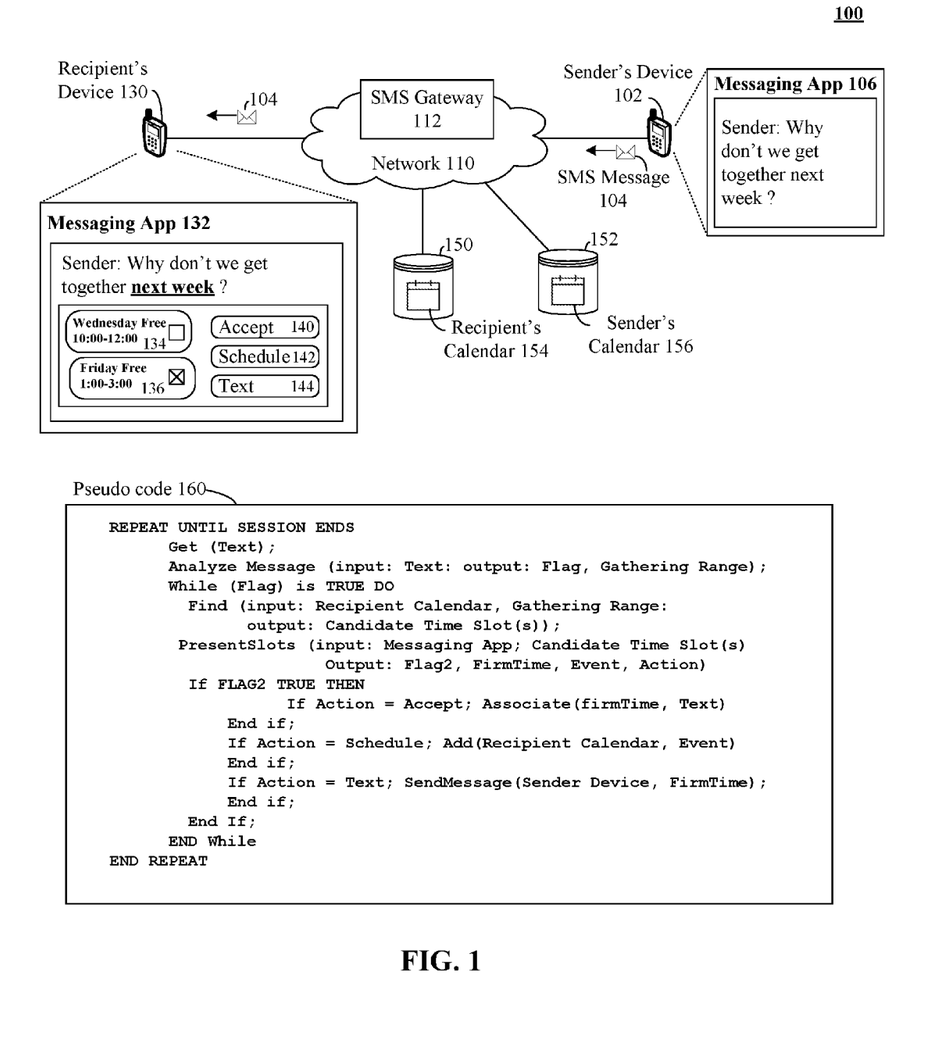
FIG. 1 shows a system for improving text based communications to integrate with calendar entries to facilitate establishing a firm time for a gathering in accordance with embodiments of the disclosure.

FIG. 1 shows a system 100 for improving text based communications to integrate with calendar entries to facilitate establishing a firm time for a gathering in accordance with embodiments of the disclosure. In system 100, a communication session can be established over a network 110 between a sender's device 102 and a recipient's device 130. In an embodiment, the communication can be a short messaging system (SMS) communication conducted through a SMS gateway 112. Each device (102, 130) can run a messaging application (106, 132). A sender can convey an SMS message 104 from messaging application 106 that indicates a contemplated meeting/gathering, where the message 104 does not specify a firm time for the gathering. This is referred to as a no-specific-time (NST) communication that includes a NST text segment. As shown in FIG. 1, the message 104 includes the text segment "next week" as an example of a NST text segment, which is conveyed to the recipient's device 103 and presented via messaging application 132.

Presentation of the NST text segment may be provided within a graphical user interface of application 132 in a number of contemplated ways. For example, the NST text segment (e.g., "next week") may be visually distinguished (e.g., highlighting, underlining, bolding, changing font color, etc.) automatically upon being automatically detected. The presentation can be followed by showing a set of one or more time slots 134, 136 as automatically generated suggestions for converting the vague "next week" reference to a firm time. This firm time can be one that is non-conflicting with the recipient's calendar 154. The time slots 134, 136 can be ones "open" per the recipient's calendar 154. In one embodiment, calendar entry (of calendar 154) importance can be evaluated relative to the import of the proposed gathering suggested by the NST text segment, and time slots (of lesser relative import) can be suggested as candidate time slots (134, 136) even when conflicting scheduled events are present. In one embodiment, the one or more time slots 134 136 can be presented in an on-hover (appearing/disappearing text box) upon hovering a pointer over the NST text segment (e.g., next week). One or more options may be provided to select among the time slots 134, 136. As shown, a check box may be presented proximate to each. In another embodiment, a "tap" or "click" selection can be enabled for each GUI element showing a time slot (134, 136). Once a selection of a time slot 134, 136 is made, one or more actions (140, 142, 144) can be provided to the recipient via a GUI of messaging app 132.

In one embodiment, the scheduling facilitation availability to the recipient remains obscured or unavailable to the sender. That is, the sender (and sending device 102) is not presented with any recipient calendar 154 insights unless the recipient chooses to present this information to the sender via a subsequent message or response. Similarly, the sender's calendar 156 is inaccessible to the recipient or to the messaging system. This obscuring of information is significant, as often a meeting is more (or less) important to one party than the other, and a level at which the recipient must reschedule to make a given meeting or is unwilling to meet despite availability is unknown (and remains unknown) to the sender.

One user-selectable options presented in the GUI includes an Accept 140 action, which links the selected time slot (shown as item 136 for Friday 1:00-3:00) to the NST text segment (e.g., next week). In one embodiment, the SMS message (as stored for the communication session) can be modified to include the selected time slot, which is referred to hereafter as a firm time for the meeting/gathering/event. A database, in one embodiment, can establish and store an associative table entry between the text segment (and/or message 104) and the firm time, as a response of the Action 140 selection. Selection of the schedule 142 option can place the firm time for a new entry into the recipient's calendar 154. In another embodiment where access to the sender's calendar 156 is provided, a new entry for the firm time can also (or alternatively) be placed in the sender's calendar 156 responsive to selection of the schedule option 142. When access is granted to the sender's calendar 156, the time slots (134, 136) that are determined by the system 100 can be non-conflicting with the sender's calendar 156 (as well as being non-conflicting with entries of recipient's calendar 154). Selection of the text 144 option sends a message (e.g., an SMS response to message 104) to the sender (e.g., sender's device 102) that includes the firm date. This responsive message may be automatically generated (e.g., "How about Friday 1:00-3:00?") and/or can be partially generated as a message, which the recipient can edit and send through messaging app 132.

Pseudo code 160 represents high-level programmatic instructions contemplated for the NST text segment identification and facilitation of firm date establishment is shown in FIG. 1. The pseudo code 160 can repeat during a communication session (such as SMS session) for each conveyed message (e.g., SMS message 104). First the text being conveyed can be captured, as shown by the "GET" command. The message is analyzed using the text as input to generate a flag and a gathering range. The flag can be a BOOLEAN indicating whether a NST text segment is present in the text or not. When it is present, a range for an event of the NST text segment can be determined and returned. This can require a duration for the gathering be determined/estimated as well as determining a potential start and end date corresponding to the NST text segment. For example, if "next week" is included in the NST segment, then the start and end dates can be for Monday-Friday of the week following that of a time at which the message (104) was sent. The "get together" can be inferred (in context) to represent a lunch/dinner event having a duration of 2 hours. The duration can be determined/inferred from past events (from the calendar 154) involving the recipient and/or sender in one embodiment. In another embodiment, a series of preferences, rules, and defaults can be used to determine the duration.

Turning back to the pseudo code 160, no action is taken unless a NST text segment is identified. If an NST text segment is identified (FLAG=TRUE) then a set of time slots (e.g., slots 134, 136) can be found given the recipient's calendar 154 and the gathering range (e.g., estimated duration). These slots can be presented to the GUI of messaging app 132, which can receive a selection, a firm time, an event, and one or more actions (e.g., 140-144). If the Flag2 from the presentation is FALSE, no firm time is selected and not actions are to be taken responsive to presenting the time slots (134, 136) to the recipient via the GUI (of messaging app 132). If Flag2 is TRUE and if an Action is to accept one of the time slots as a firm time, the firm time is associated to the text (or to the NST text segment). IF the action is to schedule, a new event is added to the recipient's calendar 154 having the firm date. In one embodiment, additional event elements can be prompted for via the GUI (which can be the GUI of the SMS application in an embodiment). If the Action is to Text (or send) the message to the sender with the firm date, a message to that effect (e.g., a SMS message) can be conveyed. Appreciably, the pseudo code 160 is intended for exemplary purposes and alternatives/derivatives are contemplated herein.

Figure 3:
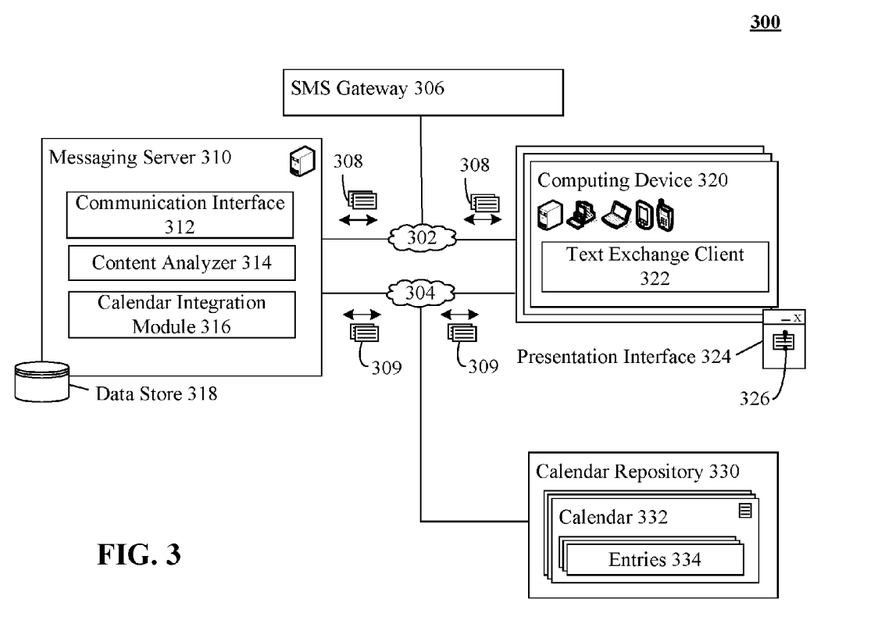
FIG. 3 shows a system that is an embodiment for implementing components of the system of FIG. 1.

As used herein, a NST text segment is a portion of a message (104), such as conveyed between two or more devices during a communication session involving those devices. The NST text segment references a future time for a gathering (e.g., a meeting, event, etc.) that lacks a specific date and time able to be used to calendar the gathering within a recipient's calendar 154 (and/or sender's calendar 156). For example, a range of times can imply a level of ambiguity with regard to the specific time that is unable to be handled by a calendaring program/system (assuming specific defined time slots are required to schedule an event within such a calendaring program/system). For example, "next week" is an indefinite reference to a specific time for a gathering/meeting/event that is consuming significantly less time than the entire week. Such phases are often used during communications which in context semantically implies or means that the exact meeting time (firm time) is not yet specified. Further, depending on context, "next week" can imply a time within the next two weeks or month. This context can be determined from defined rules (e.g., within pseudo code 160 and/or server 310, analyzer 314, or module 316). Other NST text segments can reflect a tentative arrangement, such as "some time" or "about noon" which in context reflects an uncertainty yet to be decided upon, but resolved by establishing a firm time (after the system 100) discovers time slot availability within the calendar(s) 154, 156. Other NST times can be established by context; such as "we should get together for your birthday" where the calendars denote the date of birth, and logic embodied in the system 100 determines a suitable set of time slots for this NST event.

Although the system 100 focuses on establishing a time slot for a NST event, embodiments of the disclosure contemplate the system suggesting (via time slot's) a number of concrete events for an ambiguous statement that correspond, where relevant durations are indicated for the events. For example, a NST text segment of "lets hang out soon" can be translated into automatically generated events (suggested appearing as time slots 134, 136 for example) such as "see a specific movie at a specific time" ones, where the movie selected is based on logic known to apply to both sender and receiver and where the time is based on local availability posted online. Other possible events can be prompted for such as "See Les Miserables" where the times for available performances of the musical are checked against calendar availability. In such an instance, a selection of this time slot (for "Les Miserables") can dynamically alter the selectable actions to include "purchase tickets for self/sender" consistent with the time slot. Thus, the establishment of specifics can be automated utilizing logic included into embodiments of the disclosure. Stated differently, the actions presented for the specific time slots can be dynamic and can vary depending on which of the time slots is selected in one embodiment of the disclosure.

One embodiment of the disclosure can automatically detect conflicts during text communications (e.g., SMS ones) between planned times (including NST text segments and other segments with firm times included) and the sender's/recipient's calendars 154, 156 and can automatically prompt/notify the sender/recipient of this conflict. For example, if the sender started to SMS text "How about lunch at 12:00 on Friday" to the recipient, a popup notification can be presented to the sender of a conflict before the text was conveyed, such as "NOTICE: you have planned lunch with your wife at noon on Friday, would you still like to send ?" This provides an advanced warning of a scheduling conflict that the sender may not be aware of, before a time is provided. In such an instance, an alternate set of non-conflicting times can be found/suggested automatically. Thus, embodiments of the invention can enable an innovation analogous to an "autocorrect" that automatically detects scheduling conflicts and tries to ameliorate them whenever a communicator (sender or receiver) is specifying dates during a SMS communication. Thus, embodiments of the invention contemplate the active detection of dates during SMS communications, an active checking of related schedules per accessible calendars, and prompting users of these conflicts to minimize conflict occurrences. In one embodiment, an action able to be taken can be to rearrange a schedule to change an existing appointment to ensure a desired time slot (134, 136) related to a message 104 is no longer conflicting. This feature can be highly useful when attempting to schedule a meeting between two people who have extremely full schedules, where in absence of a rearrangement feature, finding an "open" time for a contemplated meeting is challenging to non-viable, within the expected meeting range. When no times are available, a prompting to the same (such as your schedule is full, no time slots open) to the recipient/sender can occur. In one embodiment, a suggestion to change an aspect of the NST text segment (such as an activity requiring a lesser duration, that increases the number of candidate time slots per the calendar(s) 154, 156) is implemented within system 100.

Figure 2:
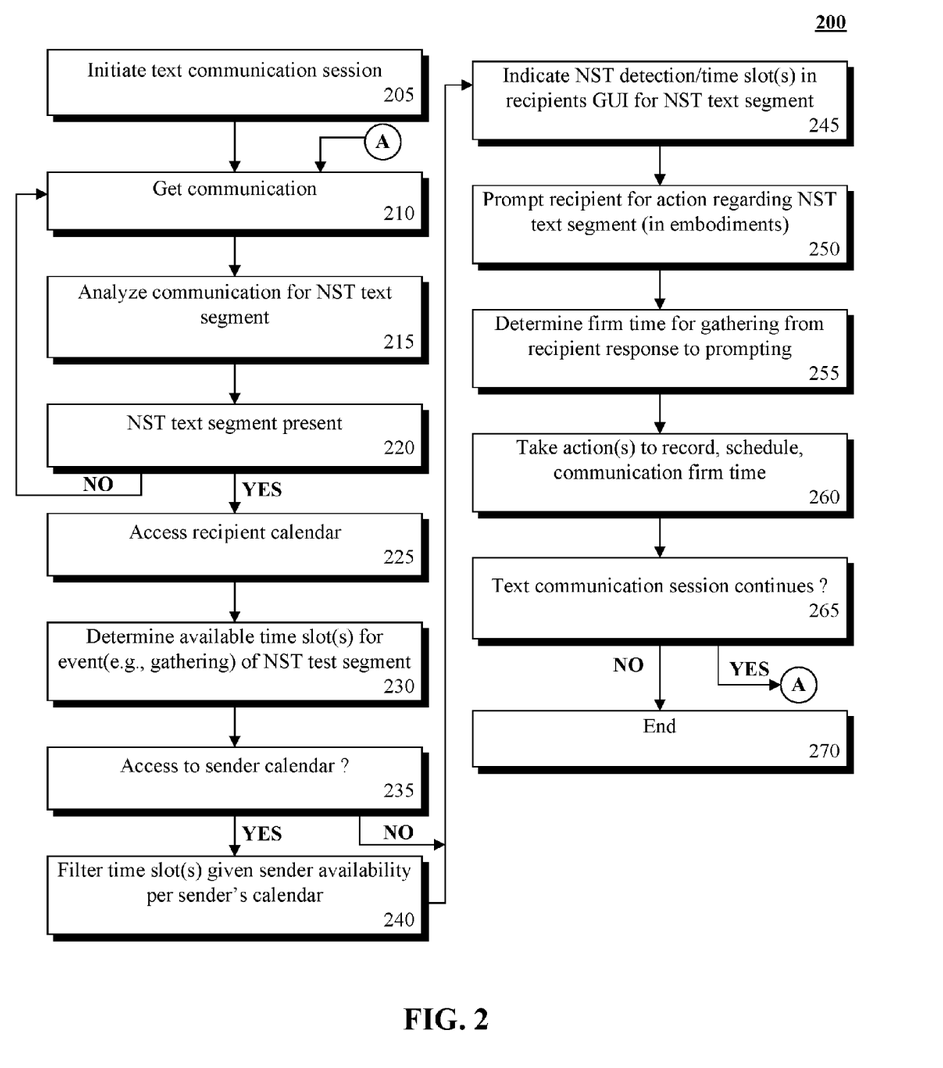
FIG. 2 shows a flow chart for an embodiment of the disclosure, which is consistent with the system and pseudo code of FIG. 1.

FIG. 2 shows a flow chart 200 for an embodiment of the disclosure, which is consistent with system 100 and pseudo code 160. The flow chart 200 can begin in step 205, where a text communication session (e.g., an SMS session) is initiated between a sender's device and a receiver's device. In one contemplated embodiment, the communication is a chat session (occurring online via a chat or social networking server) instead of being an SMS communication via a SMS gateway. In another embodiment, the communication is an email communication conducted through an email server. Communications can be intercepted/examined (at the server, for example, before being conveyed), as shown by step 210. In step 215, the communication (such as SMS message 104) is analyzed to determine whether it contains a NST text segment. When no NST segment is included, other communications can be conveyed during the session, shown by looping from step 220 to step 210. When there is a NST text segment within a communication, the process proceeds from step 220 to step 225, where a recipient calendar is accessed. The calendar is stored in a network accessible data store located remote from (and maintained independent of) the SMS server (or SMS gateway). This calendar may require user name/password, which is provided by the messaging server (e.g., server 310) for access in embodiments. Thus, the messaging system/server must maintain a table/database between text messaging users and user name/passwords of an independent calendaring system/server in embodiments. In step 230, one or more available time slot(s) can be determined for the event/gathering/meeting alluded to in the communication containing the NST text segment. The slots can be continuous time periods for a duration determined appropriate for the event (automatically) and between a start and end time consistent with the NST text segment. In one embodiment, access may be provided to the sender's calendar (which also requires user name/password entry in embodiments, which can be stored for access purposes by the messaging server). When no access exists, the method advances from step 235 to step 245. When there is access, the time slots (determined from the recipient's calendar) can be filtered to include only those time slots for which the sender is also available, per the sender's calendar, as shown by step 240.

In step 245, the sender's message can be displayed in a GUI of a text messaging client of the recipient. The NST text segment can be indicated visually to highlight a possible, but not firm meeting in the future. In one embodiment, time slots automatically generated (per steps 230-240) can be incorporated into the text of the message seen in the recipient's text messaging client (via the GUI). Numerous GUI mechanisms are contemplated as alternatives, such as providing a hover-over event (linked to the NST text segment) where hovering a pointer shows the time slots. Icon(s) and/or other selectable (click-able, touch-able) GUI elements can be included for selective display of the time slots. In another embodiment, a linkage to entries of the recipient's calendar can also be displayed for user viewing and/or editing at this point. When more than one time slots are presented as options, the end-user can select one as a firm time for the NST text segment. In step 250, a recipient can be prompted for an action regarding the NST time segment (such as accepting, scheduling, or texting/communicating the firm date). In step 255, a firm time (if none has been determined) can be decided upon. For example, a default time slot may be tentatively selected, where if a user selects an action (action 140-144), then that action occurs using the default time slot as a firm time. In step 260, the selected action is taken (to record, schedule, and communicate the firm time/event). If the text communication session does not continue, the flow chart ends as shown by progressing from step 265 to step 270. When the session continues, the flow chart loops from step 265 to step 210, where another communication during the session is obtained.

FIG. 3 shows a system 300 that is an embodiment for implementing components of system 100. In one embodiment of system 300, two different networks 302 and 304 exist, where communications (messages 308) occur over network 302 and calendar and date information 309 is conveyed over network 304. Network 302 is a telephony network in embodiments, where the communications are SMS messages conveyed using SMS gateway in accordance with SMS protocols. In one embodiment, the SMS gateway 306 can be replaced with a different type of gateway for a different type of messaging. Network 304 is an IP network, such as a public internet. One or more calendar repositories 330 maintaining calendars 332 with a set of entries 334 is linked to network 304. Text exchange clients 322 of the computing devices 320 (of the sender/recipient, for example, although additional entities are contemplated as the disclosure is not limited to two party communications; multi-party (3 or more) communications are contemplated). The messaging server 310 facilitates the conveyances of the communications 308 between different ones of the communication device(s) 320.

The SMS gateway 306 can allows a computing device 320 to send or receive Short Message Service (SMS) transmissions (e.g., communications 308) to or from a telecommunications network (e.g., network 302). SMS gateway 306 per SMS standards allows messaging between any mix of fixed and mobile equipment. SMS gateway 306 can use frequency-shift keying to transfer the message between the terminal (one device 320) and a direct-to-short message service center (SMSC), which can be a component of server 310. Terminals (computing devices 320) in embodiments are based on Digital Enhanced Cordless Telecommunications (DECT). Wired handsets and wired text-only (no voice) devices (320) are contemplated. In one embodiment, communications (308) are received by the terminal (device 320) recognizing that the Caller ID involved is that of the SMSC. When using SMS messaging, the computing device 320 silently goes off hook to receive the message (communication 308). In contemplated embodiments, the SMS gateway 306 is a Global System for Mobile Communications (GSM) gateway appliance, a direct-to-SMSC gateway, and a direct to SMS gateway. When implemented as a GSM gateway appliance, the gateway allows SMS text messages to be sent and/or received by email, from Web pages or from other software applications by acquiring a unique identifier from the mobile phone's Subscriber Identity Module, or "SIM card". When implemented as a direct-to-SMSC gateway, the gateway 306 connects directly to a mobile operator's SMSC via the Internet or direct leased line connections and a Short Message Peer-to-Peer (SMPP) protocol is used to convey SMS between an application running on device 320 (e.g., text exchange client 322) and the SMSC. When implemented as a direct to SMS gateway, the gateway 306 connects with mobile network SMSC(s) in order to send/receive messages (communications 308) and/or other SMS gateways in order to reach mobile subscribers (device 320) on multiple mobile networks.

Messaging server 310 can be a hardware/software component facilitating the communication and storage of messages over a network 302 between remotely located computing devices 320. Messaging server 310 can include a communication interface 312, a content analyzer 314, a calendar integration module 316, and a data store 318. In one embodiments, the content analyzer 314, and calendar integration module 316 is given access to the recipient's calendar (332) only and lacks access to the sender's calendar. Similarly, the sender is not provided any insight into the recipient's calendar via the messaging server 310 (or content analyzer 314 or calendar integrator 316 in particular). This permits a level of maintaining confidentiality of protected scheduling information between parties so that a recipient is not subtly pressured to meet when it is less than desired (which would occur if the sender was made aware of the recipient's availability) and so the sender is not informed of any rescheduling activities taken by the recipient (which may indicate that the recipient values the meeting more than the sender should the recipient wish this fact to remain obscured). Thus, in embodiments of the disclosure, the scheduling function is explicitly designed to be recipient facing and to preserve confidential scheduling information (which the recipient can thereafter choose to make available to the sender or not via text exchange responses/communications).

The communication interface 312 can include application programming interface (API) or other interface standard that facilitates interoperability for purposes of communicating/storing the communications 308. In one embodiment, the communication interface 312 can be a web service interface. In embodiments of server 310, text exchange messaging (communications 308) occurs within an asynchronous architecture. Server 310 can, in embodiments, provide synchronicity for file attachments without affecting architecture functionality. It should be appreciated that server 310 can be arbitrarily complex and is not limited to the exact arrangements described herein.

Content analyzer 314 can be a hardware/software entity for processing communications 308. The communications 308 are analyzed by the content analyzer to determine whether or not they contain any NST text segments. When NST text segments are detected, the content analyzer 314 can determine duration for an associated meeting/event/gathering. The content analyzer 314 can also determine as time range (including start and end times) for a NST event. In one embodiment, pseudo code 160 or the equivalent can be implemented as part of the content analyzer 314. In one embodiment, analyzer 314 can determine the semantic context of communications 308 to intelligently notify a user (e.g., recipient) of NST events and can facilitate the establishment of a firm time for such events. For example, the content analyzer (after accessing one or more calendars 332) can determine a set of time slots, each of which is non-conflicting with a recipient's and/or sender's calendar for which a NST event can be scheduled. The content analyzer can facilitate this scheduling, can record/link a firm date (automatically generated, possibly selected by a user from automatically generated time slots) to a NST text segment or communication (308), and/or can communicate the firm date to the sender of a communication containing the NST text segment. In one embodiment, analyzer 314 can utilize traditional and/or proprietary semantic analysis techniques including, but not limited to, linguistic analysis (e.g., keyword detection), metadata analysis, and the like.

Data store 318 can be a hardware/software component able to persist communications 308, settings, date information 309, user settings (of recipient/sender for example), rule sets, linkages between messages and firm dates, and the like. Data store 318 can be a Storage Area Network (SAN), Network Attached Storage (NAS), and the like. Data store 318 can conform to a relational database management system (RDBMS), object oriented database management system (OODBMS), and the like. Data store 318 can be communicatively linked to server 310 in one or more traditional and/or proprietary mechanisms. In one instance, data store 318 can be a component of Structured Query Language (SQL) complaint database.

Computing device 320 can be a hardware/software permitting presentation of communications 308 and/or date information 309 via interface 324. In embodiments, computing device 320 is a mobile telephone, a tablet, an embedded computer, a notebook computer, a desktop computer, a wearable computing device, and the like. Device 320 includes one or more processors, electronic circuitry, and one or more non-transitory storage devices. Device 320 can include, but is not limited to, text exchange client 322, input/output components, user settings, microphone, camera, interface 324, and the like.

Text exchange client 324 can include, but is not limited to, an SMS messaging application, an email Web application, an email desktop application, a mobile phone email application, a VOIP conferencing application, and the like. I/O components can include, but is not limited to, a camera, a keyboard, a mouse, an accelerometer, a biometric sensor, and the like. Interface 324 capabilities can include a graphical user interface (GUI), voice user interface (VUI), mixed-mode interface, and the like. Content 324 of communications 308 is able to be generated by the input components of device 320 and is able to be presented via output components of device 320. Sender's device 102 and recipient's device 130 are embodiments of device 320.

Calendar repository 330 can be a hardware/software entity able to persist files and data, which includes those for calendars 332. In one instance, repository 330 can be a shared file storage repository including, but not limited to, a cloud based storage, a local area network accessible storage, and the like. Access to each calendar 332 can require authentication, such as a user name/password. The entries 334 to the calendars 332 represents time periods marked for specific events for a related person (such as the recipient or sender, as detailed herein). The calendar repository can be maintained independent of the messages of server 310, and can be remotely located (and require separate permission) from any messaging system (through which communications 308 are conveyed).

Network 302, 304 can each be an electrical and/or computer network connecting one or more system 300 components. Network 302, 304 can include, but is not limited to, twisted pair cabling, optical fiber, coaxial cable, and the like. Network 302, 304 can include any combination of wired and/or wireless components. Network 302, 304 topologies can include, but is not limited to, bus, star, mesh, and the like. Network 302, 304 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that one or more components within system 100/300 can be optional components permitting that the disclosure functionality be retained. Further, the flowchart of FIG. 2 and system diagrams of FIGS. 1 and 3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A text messaging program comprising processor executable instructions stored in a non-transitory storage media comprising:

a text communication interface for sending and receiving text based communications conveyed through a short messaging service (SMS) gateway between at least a sender and a recipient;

a content analyzer for programmatically analyzing the text based communications conveyed through the SMS gateway, wherein the content analyzer automatically detects no-specific-time (NST) text segments within text messages from the sender to the recipient, wherein the content analyzer responsive to detections of NST text segments programmatically facilitates establishing a firm time consistent with the NST text segment based on availability of the recipient per an electronic calendar of the recipient, wherein NST text segments references a future time for a gathering that lacks a specific date and time;

a calendar integration module for providing the text messaging program access to an electronic calendar of the recipient only, wherein the calendar of the sender is inaccessible to the recipient and is inaccessible to a system handling the text based communicating within which the content analyzer and calendar integration module runs as the recipient and the system lack access to a calendar of the sender, wherein the calendar of the sender is maintained by a system independent of the system within which the content analyzer and the calendar integration module runs, said access including search capabilities of the electronic calendar of the recipient to automatically determine one or more specific time slots consistent with the NTS text segment to facilitate establishing the firm time, wherein the one or more specific time slots are automatically determined non-conflicting time frames for which the recipient is available per entries of the recipient's calendar, wherein the one or more time slots are not manually entered by the sender, by the recipient, or by any human, wherein the sender lacks access to the calendar of the recipient, wherein the sender is explicitly unaware of availability or non-availability of the recipient per the calendar of the recipient; and a recipient presentation interface for automatically presenting the one or more time slots to the recipient of the NTS text segments, wherein the recipient presentation interface is programmatically integrated with the text communication interface.

* * * * *